United States Patent [19] [11] 4,082,013
Dornfeld et al. [45] Apr. 4, 1978

[54] HYDROSTATIC TRANSMISSION CONTROL

[75] Inventors: Kenneth A. Dornfeld, Indianapolis; Jerry R. Marlow, Greenwood; Robert K. Sanders, Lebanon, all of Ind.

[73] Assignee: General Motors Corporation, Detroit, Mich.

[21] Appl. No.: 526,379

[22] Filed: Nov. 22, 1974

[51] Int. Cl.² ............... B60K 41/18; F16H 37/00; F16D 39/00
[52] U.S. Cl. ................ 74/866; 60/DIG. 2; 74/740; 74/859; 74/860
[58] Field of Search ........... 74/740, 745, 730, 731, 74/732, 733, 645, 752 A, 752 D, 336, 687, 866; 60/368, 431, 435, 436, 437, 438, 441, 445, 446, 448, 449, 459, 463, DIG. 2

[56] References Cited
U.S. PATENT DOCUMENTS

| 2,977,765 | 4/1961 | Fillmore | 70/DIG. 2 |
|---|---|---|---|
| 3,225,542 | 12/1965 | Hansen et al. | 60/368 |
| 3,463,034 | 8/1969 | Miller | 74/733 |
| 3,542,274 | 11/1970 | Miller | 60/368 X |
| 3,628,330 | 12/1971 | Miller | 60/368 |
| 3,667,225 | 6/1972 | Karman | 60/DIG. 2 X |
| 3,719,096 | 3/1973 | Sprague et al. | 74/866 X |
| 3,752,011 | 8/1973 | Casey et al. | 74/866 X |
| 3,754,482 | 8/1973 | Sanders et al. | 74/752 A |
| 3,842,694 | 10/1974 | Marlow | 74/687 X |

OTHER PUBLICATIONS

*Analysis and Design of Feedback Control Systems*, Thaler and Brown, McGraw-Hill and Co., 2nd Edition, pp. 82, 109 & 110.

*Primary Examiner*—Samuel Scott
*Assistant Examiner*—Lance W. Chandler
*Attorney, Agent, or Firm*—Warren D. Hill

[57] ABSTRACT

An electronic control for a hydrostatic or hydromechanical transmission governs the transmission ratio as a primary function of a manual ratio request and as a secondary function of throttle setting, engine speed, pressure in the hydrostatic transmission and manual range selection. A ratio control signal is developed by comparing ratio request with the existing ratio control signal and integrating the difference to provide a smoothly changing ratio, and the rate of change is limited to a maximum value. Ratio change of the hydrostatic unit is carried out by varying the displacements of the hydrostatic pump and motor. The displacements are changed by servo motors electrically controlled by the electrical ratio signal. Synchronous range shifting in a gear set is accomplished by applying one torque transmitting device (e.g. brake or clutch) and releasing another torque transmitting device, each of which is fluid pressure operated. Pressure switches associated with each device determine whether it is applied or released. During range shifting, the hydrostatic unit is prevented from changing ratio until the shift is effected as indicated by the condition of the pressure switches. Engine speed is maintained within programmed limits by varying the ratio to prevent overspeed or underspeed. Shift logic and inhibit circuits responsive to manual range selection, transmission output speed, and the ratio control signal initiate range shifting only under desirable conditions.

9 Claims, 10 Drawing Figures

HYDROSTATIC TRANSMISSION CONTROL

This invention relates to a transmission control and especially to a control for hydrostatic or hydromechanical transmissions. Hydrostatic transmissions are characterized by a very high gain which provides a very rapid response to small control inputs, thereby requiring an accurate control and preferably a slow acting control to avoid abrupt changes of ratio. When a hydrostatic transmission has its output coupled to a multi-range gear set, control of the hydrostatic unit ratio becomes important in avoiding undesirable shocks to the power train during range shifting of the gear set.

It is therefore an object of the invention to provide an accurate control for a hydrostatic transmission as a function of the time integral of the difference between the actual ratio and the requested ratio.

Another object is to provide in such a transmission a limited rate of response to a requested ratio such that ratio changes are brought about gradually and smoothly.

Yet another object of this invention is to provide in such a transmission control an engine governing circuit to modify transmission ratio to prevent engine overspeed and underspeed.

A further object is to provide in such a transmission control a response to the fluid pressure developed within the hydrostatic unit to relax ratio requirements when pressures exceed a preset limit.

An additional object of this invention is to provide in a control for a hydrostatic transmission coupled with a mechanical multi-range gear set, a way of preventing ratio changes in the hydrostatic unit during range shifting in the gear set while restoring the ability to change ratio as soon as a shift is completed.

The invention is carried out by providing an apparatus for comparing the ratio request signal with a ratio control signal and for integrating the difference between the two to produce the control signal while limiting the rate of change to the control signal to avoid abrupt ratio changes. The control further includes a device sensitive to excessive pressure within the hydrostatic unit to modify the ratio control signal in a manner to reduce that pressure. During the shifting of fluid pressure operated torque transmitting devices in a multi-range gear set, a control circuit prevents change of the control signal and includes pressure sensitive devices associated with the torque transmitting devices which signify shift completion and allow change of the ratio. The invention further includes a circuit for sensing engine speed and for varying transmission ratio to maintain engine speed within programmed limits.

The above and other advantages will be made more apparent from the following specification taken in conjunction with the accompanying drawings wherein like reference numerals refer to like parts and wherein.

Figure 1:
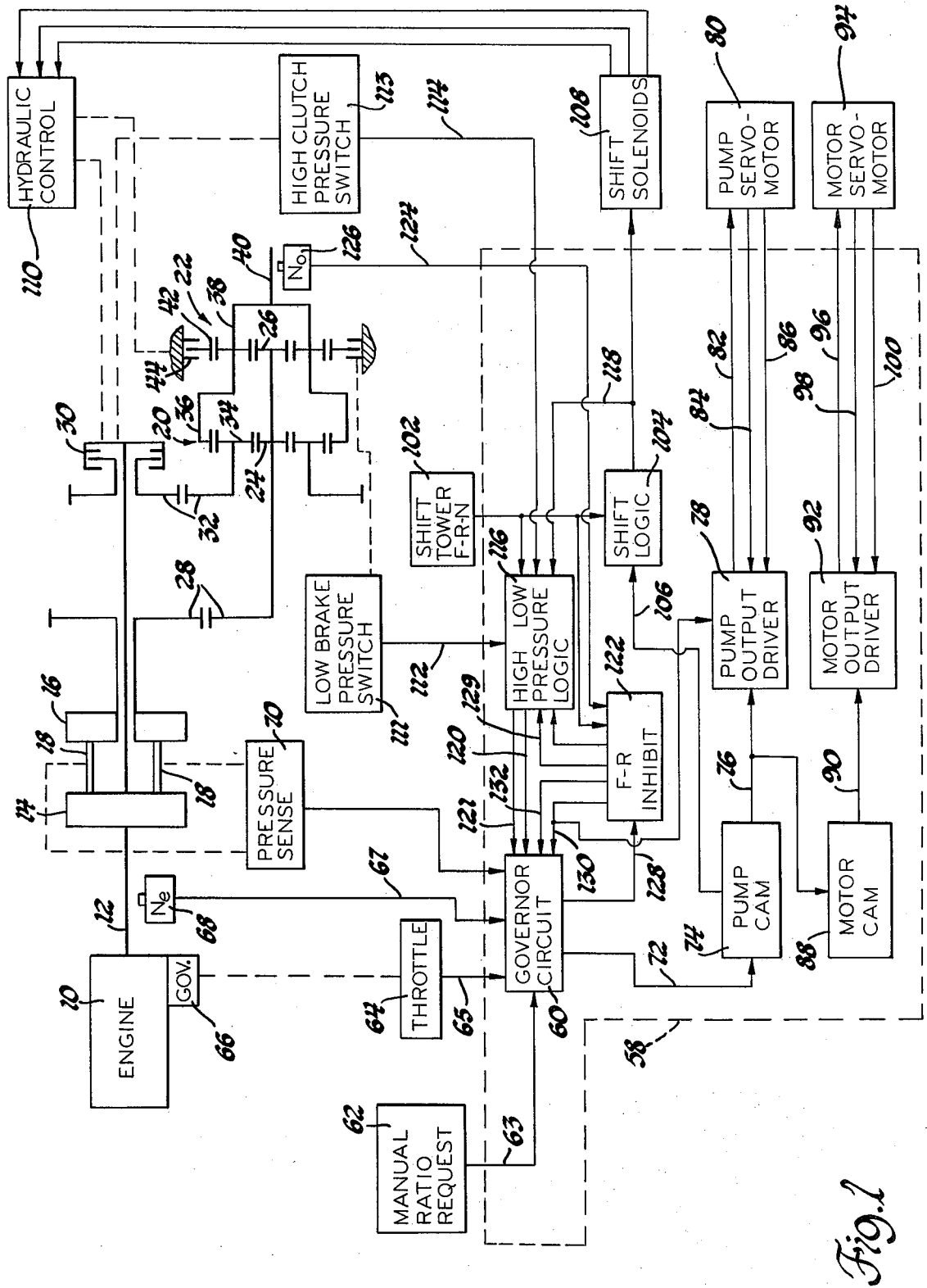
FIG. 1 is a combined schematic and block diagram of a hydromechanical transmission and control circuit according to the invention.
Figure 4:
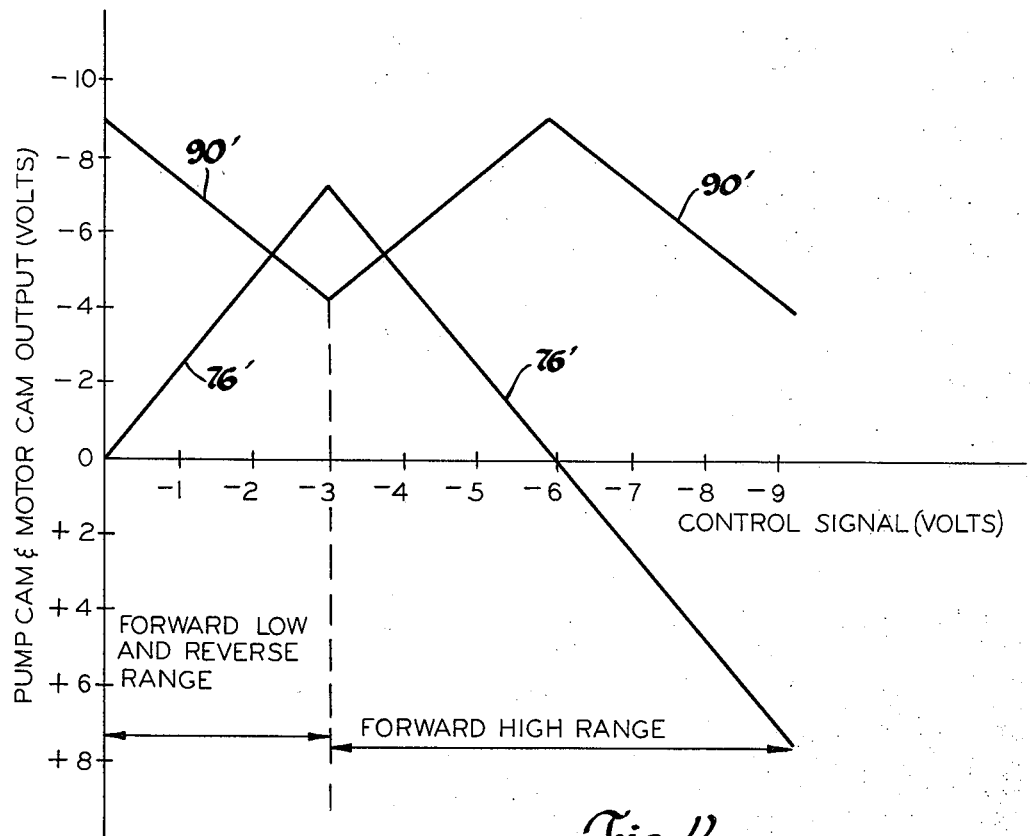
Figure 5:
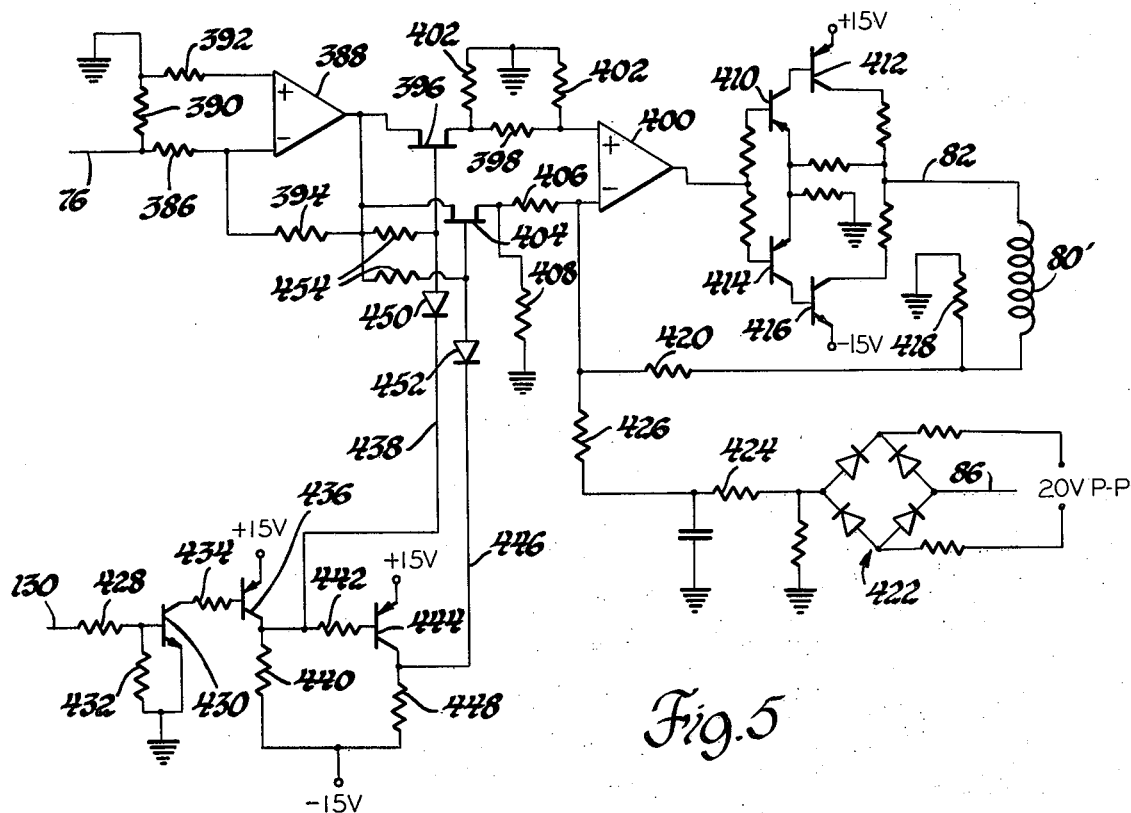
Figure 6:
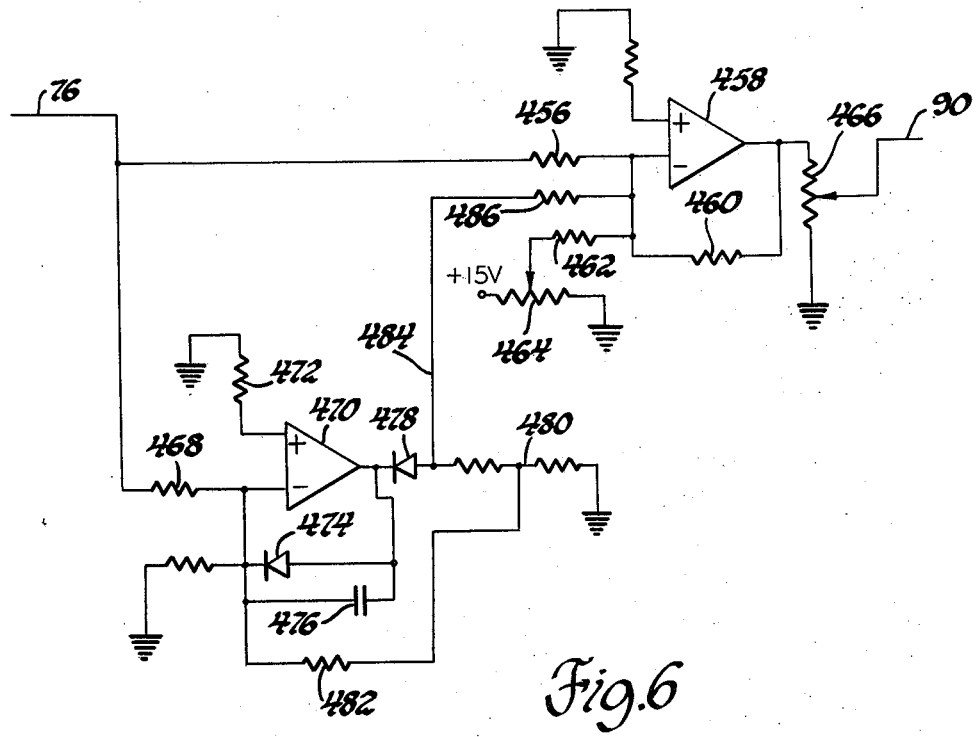
Figure 7:
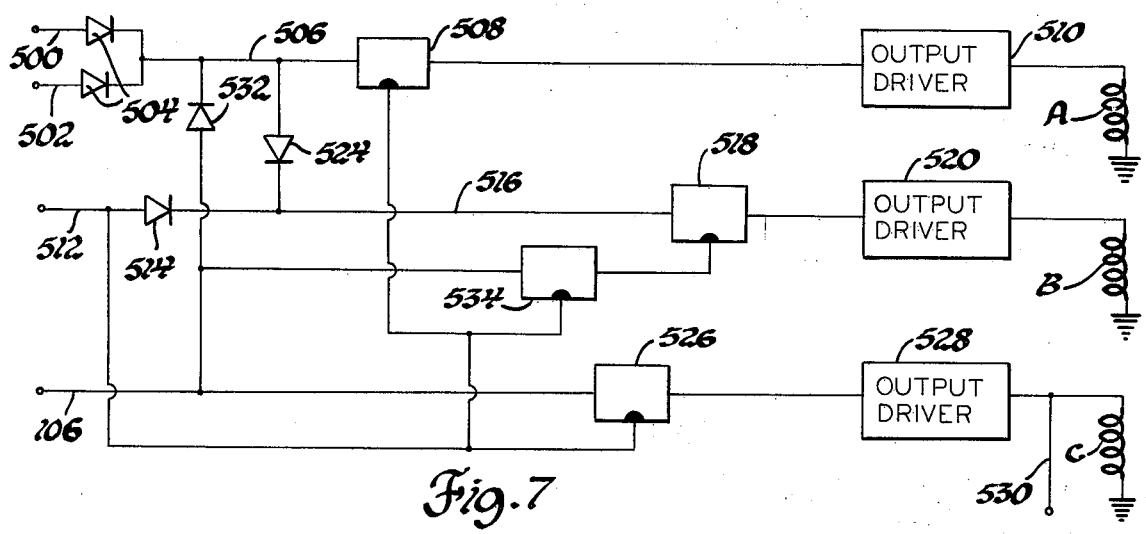
Figure 8:
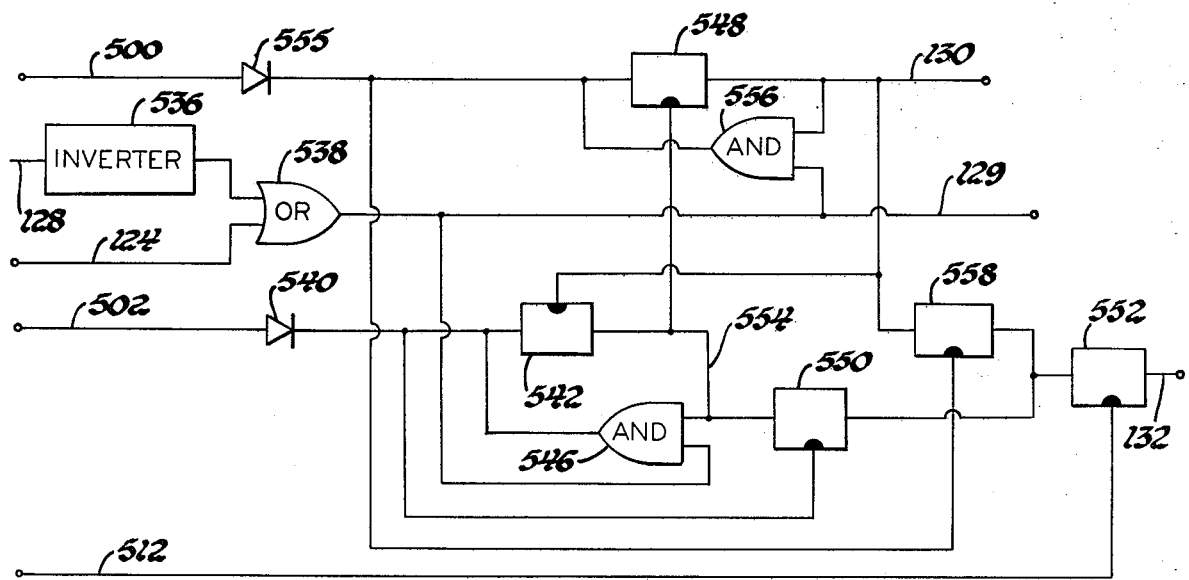
Figure 9:
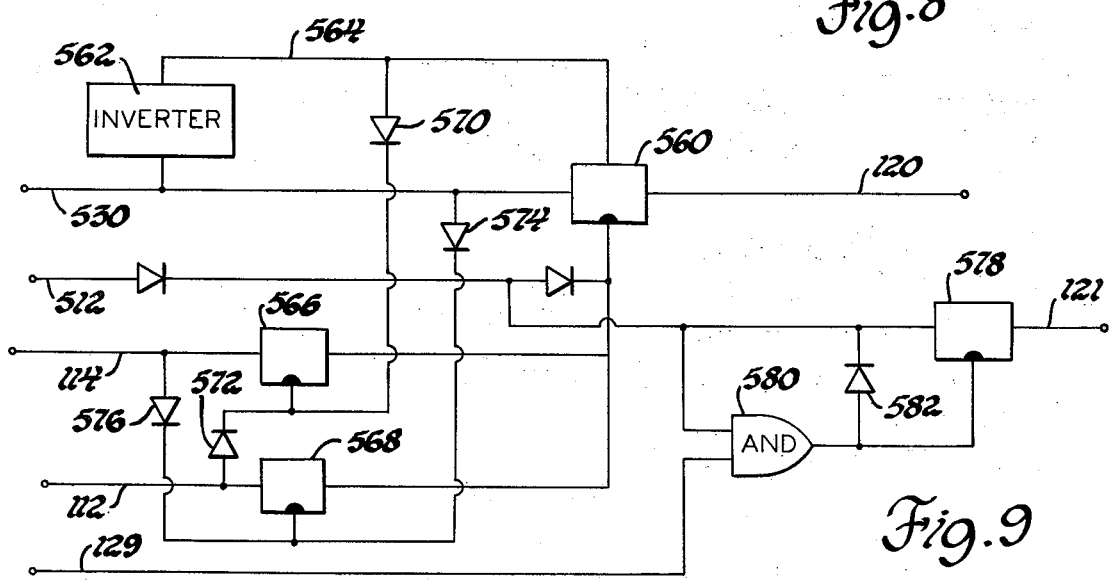
Figure 10:
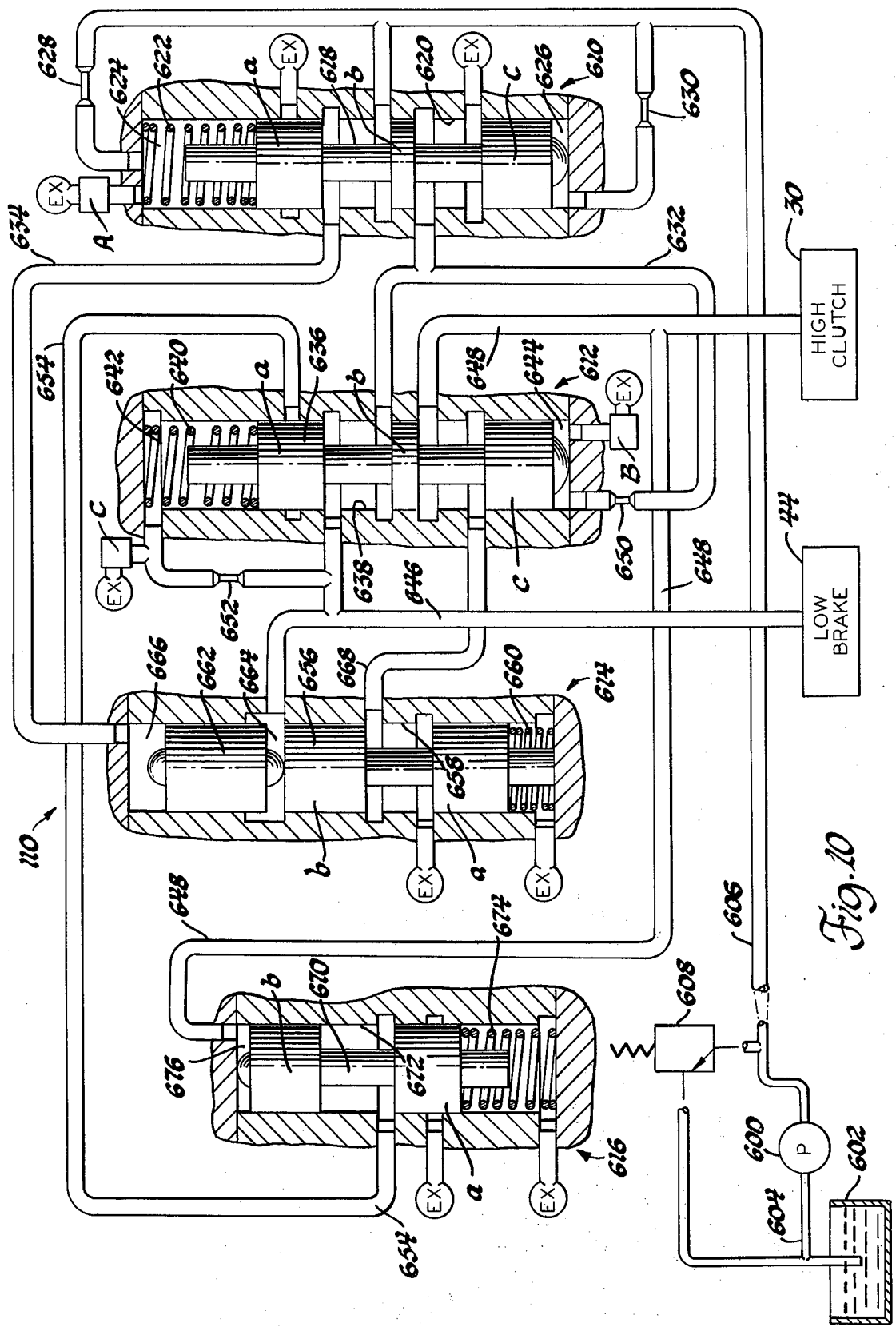

FIG. 4 is a graphical representation of the pump cam and motor cam output signals as a function of a control signal, FIG. 5 is a schematic representation of the pump output driver of FIG. 1, FIG. 6 is a schematic representation of the motor cam circuit of FIG. 1, FIG. 7 is a logic diagram of the shift logic circuit of FIG. 1, FIG. 8 is a logic diagram for the forward/reverse inhibit circuit of FIG. 1, FIG. 9 is a logic diagram of the high and low pressure logic circuit of FIG. 1, and FIG. 10 is a diagrammatic representation of the hydraulic control of FIG. 1.

While the control of the subject invention may be applied to any variable ratio hydrostatic transmission, it is described here in its preferred embodiment in a synchronous shift hydromechanical transmission of a type suitable to operate a loader, a scraper or other heavy duty earth moving equipment.

As shown in FIG. 1, an engine 10 drives a transmission input shaft 12 which drives the pump 14 of a hydrostatic transmission. The motor 16 of the transmission is coupled to the pump by passages 18 for carrying a working fluid subject to high pressures. The hydrostatic transmission is of conventional design wherein both the pump and motor have variable displacement, the displacement of each being controlled by a servo motor, in a manner to infinitely vary the transmission ratio. A mechanical gear train includes a pair of planetary gear sets 20 and 22 having sun gears 24 and 26, respectively, both coupled through suitable gearing 28 to the motor 16. The pump 14 is connected through a fluid pressure operated clutch 30 and suitable gearing 32 to the carrier 34. The ring gear 36 of the planetary set 20 and the carrier 38 of the set 22 are interconnected with an output shaft 40. The ring gear 42 of the gear set 22 is connected to a fluid pressure operated brake 44. The clutch 30 and the brake 44 are termed herein "torque transmitting devices". Both devices are released when the transmission is in neutral. In addition, in neutral, the pump 14 is normally set to zero displacement so that the motor 16 is stationary. In low and reverse ranges, the brake 42 is applied and the clutch 30 is released so that the motor 16 drives the sun gear 26 and therefore the carrier 38 and the output shaft 40 according to the speed of the engine 10, the ratio of the hydrostatic unit and the gear ratio. The reverse range is distinguished from the forward range only in the direction of displacement of the pump 14 which controls the direction of rotation of the motor 16. In shifting from low to high range, the ratio of the hydrostatic unit is advanced to a predetermined value at which both portions of the clutch 30 rotate synchronously, the clutch 30 is applied and the brake 44 is released preferably with some controlled amount of overlap. In the high range, the sun gear 24, is driven by the motor 16 and the carrier 34 is driven through the clutch 30 and gearing 32 so that the ring gear 36 and the output shaft 40 are rotated.

An electronic control 58 regulates the ratios of the hydrostatic unit and the gear train. The heart of the control is the governor circuit 60. The inputs to the governor include a manual ratio request 62 preferably operated by a foot pedal and transmitting a request signal on line 63, a throttle signal 64 transmitted by line 65 and operated by the same throttle lever which controls the engine 10 through a variable speed governor 66, an engine speed input signal $N_e$ on line 67 derived from a speed transducer 68 which senses the speed of the transmission input shaft 12, and a pressure sense circuit 70 connected to pressure switches, not shown, in the passages 18 in the hydrostatic unit, each of which provides a D.C. signal to the governor circuit. The governor circuit is mainly responsive to those inputs and produces a ratio control signal on line 72 to a pump cam circuit 74. The circuit 74 generates an electrical signal on line 76 which is modified by a pump output driver circuit 78 that is connected to an electrohydraulic pump servomotor 80 by line 82 and return line 84. The pump servo motor 80 thus adjusts the displacement of the pump 14 according to the value of the ratio control signal on line 72. An LVDT (linear variable differential transformer sensitive to pump 14 displacement provides a feedback on line 86 to the pump output driver 78. The line 76 connects to a motor cam circuit 88 that generates a signal on line 90 which is modified by the motor output driver 92 to control the motor servomotor 94 according to the signal on line 96 and return line 98. An LVDT sensitive to the motor 16 displacement provides a feedback on line 100 to the motor output driver 92. Thus the servomotor 94 regulates the displacement of the motor 16 according to the ratio control signal on line 72.

A manually operated shift tower 102 provides forward, reverse and neutral select signals to a shift logic circuit 104 which also has an input on line 106 from the pump cam circuit 74 which signifies when the transmission is at a synchronous ratio and may be shifted between high and low ranges. The shift logic circuit then controls shift solenoids 108 which by means of a hydraulic control circuit 110 operate the clutch 30 and brake 44.

A low brake pressure switch 111 sensitive to the fluid pressure applied to the brake 44 and a high clutch pressure switch 113 sensitive to the fluid pressure in clutch 30 provide signals on lines 112 and 114 respectively to a high and low pressure logic circuit 116. Another input to that logic circuit is provided from the output of the shift logic circuit 104 on line 118. A pressure sense output of the logic circuit 116 is provided on line 120 to the governor circuit 60 and is effective to prevent changes of the control signal on line 72 during shifts between high and low range, thus assuring that the ratio of the hydrostatic unit does not change during a range shift. A neutral select input from the shift tower 102 is fed to the logic circuit 116, which produces a neutral hold output on line 121 leading to the governor circuit 60 when the neutral select signal is present and a mode inhibit signal, described below, is absent. The neutral hold signal maintains the control signal at zero, to insure the hydrostatic unit stays at zero ratio. A forward-reverse inhibit circuit 122 is connected to the output of the shift tower 102 and has an input on line 124 from an output speed transducer 126 which provides an analog signal $N_o$ proportional to the speed of the output shaft 40. Another input to the inhibit circuit 122 is provided on line 128 from the governor circuit 60 when the control signal on line 72 is zero. The forward-reverse inhibit circuit 122 allows a shift between forward and reverse ranges only when the control signal on line 72 is zero indicating a zero transmission ratio, and the speed of the output shaft is very close to zero. When either of these conditions is not met, a mode inhibit signal is produced on line 129 which leads to the high and low pressure logic circuit 116. In the absence of a mode inhibit signal if a reverse select signal is provided from the shift tower 102, a reverse attained signal is provided on line 130 to the governor circuit and to the pump output driver 78 which enables the latter to drive the pump 14 to a displacement providing a reverse sense to the motor 16. In addition when the mode inhibit signal is present on line 129 and a forward or reverse selection is made while the transmission is in the opposite range, a forced downshift signal will be provided to the governor circuit on line 132 to cause the control signal to rapidly decrease to zero in a controlled manner so that the selected shift may be accomplished.

Governor Circuit

Figure 2:
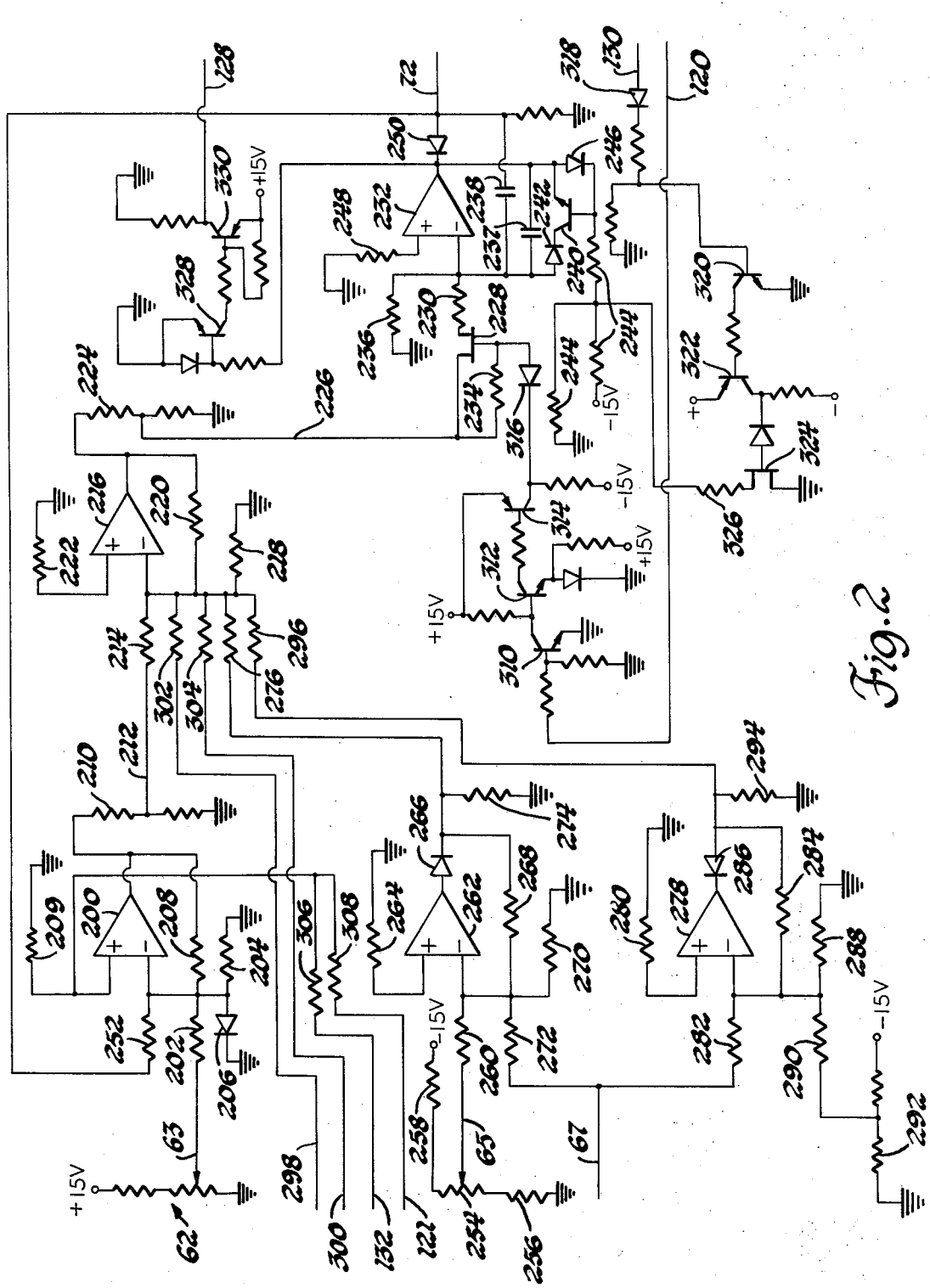
FIG. 2 is a schematic representation of the governor circuit of FIG. 1.

Referring now to FIG. 2 which schematically illustrates the governor circuit, it is understood that a power supply, not shown, provides DC voltages of various levels where indicated. The manual ratio request 62 is in the form of a potentiometer connected between +15 volts and ground and having a center tap connected to line 63 leading to the negative input terminal of an operational amplifier 200 through an input resistor 202. The negative input terminal is also connected to ground through a resistor 204 in parallel with a diode 206 and is further connected through a feedback resistor 208 to the amplifier output. The positive input terminal is connected through a resistor 209 to ground. The output of the operational amplifier 200 is fed through a voltage divider 210 to a line 212. The circuit values are so selected that the range of the ratio request signal on line 63 extends from zero to 9 volts. The operational amplifier 200, however, saturates at an input of 2.4 volts. The signal on line 212 is −2.4 volts when the amplifier is saturated. Thus the voltage on line 212 is linear with respect to the amplifier input signals for low input signals, but is limited to a maximum value of −2.4 volts.

The line 212 is connected through the resistor 214 to the negative input of an operational amplifier 216. The negative input is connected to ground through a resistor 218 and to the amplifier output through a feedback resistor 220, and the positive input is connected to ground through a resistor 222. The output of the operational amplifier 216 is connected through a voltage divider 224 to line 226 which is connected through an FET 228 and an input resistor 230 to the negative input of an operational amplifier 232. The gate of the FET is connected through a resistor 234 to line 226 to normally hold the FET in conductive state. The negative input of the operational amplifier 232 is connected to ground through a resistor 236 and to the amplifier output through a small filtering capacitor 237. The amplifier output is also connected through a diode 250 to line 72 which in turn is connected through a feedback capacitor 238 to the negative input of the amplifier. The output of the operational amplifier 232 on line 72 is normally negative and extends between zero and −9 volts. To limit the output voltage, a transistor 240 has its emitter connected to the amplifier output and its collector connected through a diode 242 to the negative input of the amplifier. The transistor base is connected through a resistor network comprising resistors 244 connected with a source of −15 volts with the base bias so selected that the transistor will conduct when the amplifier output tends to exceed −9 volts. A diode 246 extends between the transistor emitter and base. The positive input of the amplifier 232 is connected to ground through resistor 248. It will thus be seen that the operational amplifier in conjunction with the feedback capacitor 238 comprises an integrator which integrates the signal on line 226. The integrator output on line 72 comprises the ratio control signal in the governor output. When the amplifier 232 input is such that the output decreases from a negative value to zero, the diode 250 is back-biased so that the feedback capacitor 238 is ineffective thus allowing the amplifier output to quickly reach a high positive value.

The line 72 is connected through an input resistor 252 to the negative input of the amplifier 200 to provide a feedback signal thereto. The magnitude of the ratio control signal on line 72 represents the actual transmission ratio since the hydrostatic unit has very high gain and can accurately and rapidly follow the control signal. The net input to the negative terminal of the operational amplifier 200 is the algebraic sum of the negative signal on line 72 and the positive signal on line 63, representing the difference between the actual transmission ratio and the requested ratio. Thus, the ratio control signal 72 is the time integral of the difference between the actual and requested ratios but is limited to a maximum rate of change due to the saturation limiting of the operational amplifier 200. This maximum rate of change, in terms of vehicle acceleration is preferably 9 ft/sec$^2$.

The throttle signal input on line 65 is provided by a variable potentiometer 254 which is connected through resistors 256 and 258 to a source of $-15$ volts and ground. Line 65 is connected through resistor 260 to the negative input terminal of an operational amplifier 262 which has its positive input connected through resistor 264 to ground. The amplifier output is applied through a diode 266 and a feedback resistor 268 connected to the negative input terminal. The negative input terminal is also connected through a resistor 270 to ground and resistor 272 to line 67 carrying the input speed signal $N_e$. The diode 266 is connected to ground through a resistor 274 and to the negative input of the operational amplifier 216 through a resistor 276. In operation, the negative input signal of the amplifier serves as a summing junction for the throttle signal and the input speed signal such that when the negative throttle signal exceeds the positive input speed signal, a positive voltage is applied through the resistor 276 to the operational amplifier 216 thereby tending to reduce the control signal on line 72 to decrease the transmission ratio and consequently cause an increase of engine speed until the input speed signal equals the throttle signal. Thus an engine underspeed control is established with the value of the speed limit being variable linearly according to the throttle signal. Due to the presence of the resistor 256, the throttle signal has a minimum value which establishes a minimum engine speed.

Engine overspeed limiting is provided by the circuit including an operational amplifier 278 which has its positive input terminal grounded through a resistor 280 and its negative input terminal connected through a resistor 282 to line 67 and through a feedback resistor 284 and a diode 286 to the amplifier output. The negative input is further connected through a resistor 288 to ground and through a resistor 290 to a voltage divider 292 which is connected between $-15$ volts and ground to provide a preset bias voltage to the negative input terminal. The amplifier output is applied through the diode 286 to ground through a resistor 294 and to the negative input of the operational amplifier 216 through a resistor 296. In operation when the input speed signal $N_e$ on line 67 exceeds the value of the negative preset bias voltage, the amplifier 278 applies a negative voltage to the input of the amplifier 216 thereby tending to increase the control signal on line 72 and the transmission ratio to decrease engine speed until the output speed signal is reduced to the value of the bias signal. The bias signal is selected to represent the maximum desirable engine speed. Optionally, the bias signal may be varied with the throttle setting to provide a variable maximum engine speed.

Input lines 298 and 300 from the pressure sense circuit 70 are connected through resistors 302 and 304 respectively to the negative input terminal of amplifier 216. When the pressure of the working fluid in either of the passages 18 in the hydrostatic unit exceeds a preset value, one of the lines 298 or 300 will be positively energized to $+15$ volts by the pressure sense circuit 70 to apply a positive signal to the input of the amplifier 216 thereby causing the transmission ratio to decrease sufficiently to reduce the pressure of the working fluid to the preset value. Since the pressure signals on lines 298 and 300 and the output of the amplifiers 262 and 278 do not pass through the amplifier 200, they are not limited by the saturation of the amplifier 200, but by the saturation of amplifier 216. The resulting maximum rate of change of the control signal in terms of vehicle acceleration is 36 ft/sec$^2$.

The forced downshift signal on line 132 from the forward-reverse inhibit circuit 122 comprises $+15$ volts applied through a resistor 306 to the positive input terminal of the operational amplifier 200. This large positive input signal saturates the amplifier 200 in the positive direction and causes decrease of the control signal on line 72 at the maximum rate allowed by the amplifier 200, or 9 ft/sec$^2$, except for short hold periods during gear shifting, thereby quickly returning the transmission to zero ratio. A neutral governor hold signal on line 121 from the high and low pressure logic circuit on line 116 also comprises a $+15$ volt signal applied through resistor 308 to the positive input of the amplifier 200. This signal is applied only when the control signal on line 72 is at zero and assures that the control signal remains at zero so long as the neutral governor hold signal on line 121 is applied.

A pressure sense signal on line 120 is applied during shifting of the torque transmitting devices in the gear train to prevent a change in ratio during shifting. The line 120 is connected to a switching circuit including transistors 310, 312 and 314 which are connected through a diode 316 to the gate of the FET 228. When a positive pressure sense signal is applied to line 120, a negative voltage is applied to the gate of the FET rendering the FET non-conductive thereby preventing the signal on line 226 from reaching the integrator so that the control signal on line 72 will be held constant while the pressure sense signal is applied.

The reverse attained signal on line 130 is passed through a diode 318 to a switching circuit including transistors 320 and 322 connected to the gate of an FET 324 which has one terminal connected to ground and the other terminal connected through resistor 326 to the junction point of resistors 244. This decreases the bias on the base of transistor 240 so that the transistor will become conductive at a low output voltage of amplifier 232 to limit the range of the control signal on line 72 from zero to $-3$ volts when the transmission is in reverse.

A zero governor switch comprises a switching circuit including transistors 328 and 330 connected between the output of the operational amplifier 232 and line 128. When the amplifier output is negative, the transistors 328 and 330 are non-conductive so that the output line 128 is at ground potential. When, however, the output of the amplifier 232 declines to zero, it rapidly goes positive, as described above, and the transistors 328 and 330 conduct to apply a positive voltage to line 128.

Pump Cam Circuit

Figure 3:
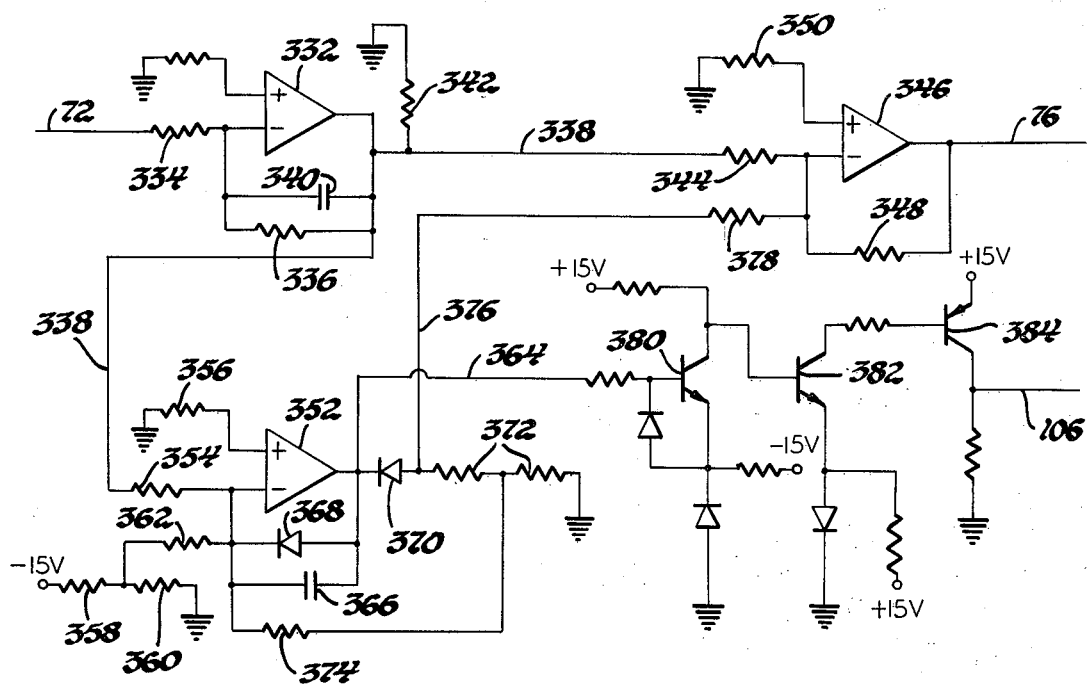
FIG. 3 is a schematic representation of the pump cam circuit of FIG. 1.

The pump cam circuit 74 as shown schematically in FIG. 3 is responsive to the control signal on line 72 to generate an output on line 76 which varies according to the desired pumping displacement as a function of the control signal as shown in the diagram of FIG. 4. Referring to FIG. 4, the signal 76' on line 76 increases linearly from zero to −7.2 volts as the control signal increases from zero to −3 volts. This corresponds to the operation in the reverse or forward low ranges. In forward high range, the signal 76' changes linearly from −7.2 volts to +7.2 volts as the control signal increases from −3 volts to −9 volts. In terms of pump displacement which is proportional to the signal 76', the pump displacement is zero for a control signal of zero or −6 volts, while the pump displacement is maximum in one sense at −3 volts of the control signal and reaches a maximum in the opposite sense at −9 volts of the control signal. Referring to FIG. 3, the pump cam circuit includes an operational amplifier 332 havings its positive input grounded and its negative input connected through a resistor 334 to the line 72. The negative input is also connected through a feedback resistor 336 to the amplifier output on line 338. A feedback capacitor 340 provides some filtering. The line 338 is connected to ground through a resistor 342. The amplifier 332 performs only an inverting function such that a positive voltage will appear on line 338 in response to the negative control signal on line 72. The line 338 is connected through a resistor 344 to the negative input of an operational amplifier 346 which has a feedback resistor 348 and its positive terminal is connected to ground through resistor 350. The output of amplifier 346 is applied to line 76. Line 338 is also connected to the negative input terminal of an operational amplifier 352 through an input resistor 354. The positive terminal of the amplifier is grounded through resistor 356. A voltage divider comprising resistors 358 and 360 are connected between −15 volts and ground, and the midpoint of the resistors are connected through a resistor 362 to the negative input terminal of the amplifier 352 to provide a negative bias. The bias is set to allow the amplifier output to go negative only after the positive signal on line 338 exceeds +3 volts. The amplifier output on line 364 is connected through a feedback filtering capacitor 366 and a feedback clamping diode 368. The output line 364 is also connected through a diode 370 and a pair of resistors 372 to ground, the junction of the resistors being connected through a feedback resistor 374 to the negative input of the amplifier. The diode 370 prevents positive signals from passing to line 376 which is connected through an input resistor 378 to the negative input terminal of the amplifier 346.

Thus in operation as the voltage on line 72 increases from zero to −3 volts, the voltage of line 338 will increase from zero to +3 volts and since during this period there will be no signal applied to line 376, the pump cam output line 76 increases from zero to +7.2 volts. As the voltage on line 72 changes from −3 to −9 volts, the voltage on line 338 will change from +3 to +9 volts. During this period, the voltage on line 376 will increase from zero to −6 volts. Due to different values of the input resistors 374 and 378, the signal on line 376 will be dominant so that the voltage on line 76 will change from −7.2 volts to +7.2 volts as illustrated in FIG. 4.

Since it is desirable to shift from low to high range at the point of maximum pump displacement, that point is sensed by a switching circuit which is connected to line 364 at the output of the amplifier 352 and includes transistors 380, 382 and 384. The switching circuit normally produces a ground voltage on its output line 106, but when the amplifier output signal on line 364 goes negative (at −3 volts of the control signal) indicating a break in the pump cam output, a positive voltage is impressed on line 106 thereby indicating that a shift should be made.

Pump Valve Driver

The pump valve driver shown schematically in FIG. 5 drives the pump servo 80 according to the pump cam output signal on line 76. Line 76 is connected through a resistor 386 to the negative input terminal of an operational amplifier 388 and through a resistor 390 to ground. The positive input is connected through a resistor 392 to ground. A feedback resistor 394 is connected between the negative input and the amplifier output. The amplifier serves as an inverter. The amplifier output is connected through an FET 396 and a resistor 398 to the positive input terminal of an operational amplifier 400, each side of the resistor 398 being connected through a resistor 402 to ground. The output of amplifier 388 is also connected through an FET 404 and a resistor 406 to the negative input terminal of the amplifier 400. The drain of the FET 404 is connected through a resistor 408 to ground. The output of the amplifier 400 is connected to the input of a driving amplifier including transistors 410 through 416, the output of which provides the output signal on line 82. Line 82 is connected to the actuating coil 80' of the pump servo 80 and the return line 84 from the coil 80' is connected to ground through a resistor 418 and connected through a resistor 420 to the negative input of the amplifier 400. Normally, the pump displacement is accurately controlled by the current through the coil 80', however, to provide a positive feedback, an LVDT sensitive to the mechanical displacement of the pump generates an AC feedback signal on line 86 which is fed to a diode bridge demodulator 422 which produces a DC output signal connected through resistors 424 and 426 to the negative terminal of amplifier 400. The reverse attained signal on line 130 is supplied through a resistor 428 to the base of transistor 430, which base is also connected to ground through resistor 432. The emitter is grounded and the collector is connected through a resistor 434 to the base of a transistor 436. The emitter of transistor 436 is connected to +15 volts and its collector is connected to line 438 and also through a resistor 440 to −15 volts and through a resistor 442 to the base of a transistor 444. Transistor 444 similarly has its emitter connected to +15 volts while its collector is connected to line 446 and through resistor 448 to −15 volts. Line 438 is connected through a diode 450 to the gate of FET 396 while line 446 is connected through a diode 452 to the gate of FET 404. The gates of both FET's are connected to the output of amplifier 388 through resistors 454.

During operation in forward range, the line 130 is at ground potential so that transistors 430 and 436 are non-conductive and transistor 444 is conducting. Thus, a negative potential is applied to line 438 and the base of the FET 396 to render that FET non-conductive while the line 446 is positive and the FET 404 accordingly is conductive. Then the signal on line 76 is inverted by the amplifier 388 then fed through the FET 404 to the negative terminal of the amplifier 400 so that the signal on line 82 will be the same polarity as that on line 76 causing the pump displacement to be in a given direction. When, however, a reverse attained signal is present on line 130, the states of the transistors 436 and 444 will be reversed, therefore, reversing the states of the FET's 396 and 404. Then the output of the operational amplifier 398 will be applied to the positive terminal of the amplifier 400 causing the polarity of the signal on line 82 to the opposite that of line 86 driving the pump displacement in the opposite direction. Since the gear train is in the same state for both forward and reverse, the only change in the transmission for reverse is the direction of displacement of the pump.

Motor Cam Circuit

The motor cam circuit is shown schematically in FIG. 6 and is responsive to the pump cam circuit output on line 76 to generate on line 90 a signal which varies as shown by line 90' in FIG. 4. As the control signal on line 72 varies from zero to −9 volts, the signal 90' varies in linear segments in a zig-zag fashion having −9 volts maxima at zero and −6 volts of the control signal and has minima of −4.2 volts at −3 and −9 volts of the control signal. Thus, the motor displacement changes in the same fashion. As shown in FIG. 6, line 76 is connected through an input resistor 456 to the negative input terminal of an operational amplifier 458. The negative input is also connected through a feedback resistor 460 to the amplifier output as well as through an input resistor 462 to a voltage divider 464 connected between +15 volts and ground. The output of the amplifier is connected through a voltage divider 466 to the output line 90. The line 76 is also connected through an input resistor 468 to the negative input terminal of an operational amplifier 470 which has its positive input connected to ground through a resistor 472. The amplifier output is connected through a feedback diode 474 and a filtering capacitor 476 in parallel therewith to the negative input terminal. The amplifier output is also connected through a diode 478, a voltage divider 480, and a feedback resistor 482 to the negative input. The anode of the diode 478 is connected by line 484 through an input resistor 486 to the negative input terminal of amplifier 458. In operation due to the action of the diodes 478 and 474, there is no voltage produced on line 484 while the signal 76' is negative, but a linearly increasing signal is produced on line 484 when the signal 76' is positive and increases in a positive direction. At zero input on line 76, the amplifier 458 is biased to have an output of −9 volts. As the signal 76' increases negatively, the signal on line 90 decreases toward −4.2 volts and when the signal 76' decreases to zero, the signal 90' will increase again to −9 volts. Thereafter as the signal 76' increases in the positive direction, the signal on line 484 increases in the negative direction to decrease the signal 90' thereby generating the signal pattern as shown in FIG. 4.

Motor Output Driver

The motor output driver 92 is essentially the same as the pump output driver 78 shown in FIG. 5 except that the circuitry responsive to the reverse attained signal on line 130 is unnecessary since the motor servo displacement is the same in reverse range as in the forward low range.

Shift Logic Circuit

The shift logic circuit as well as the circuits described subsequently herein are shown diagrammatically as logic circuits primarily employing diodes and inhibit gates which latter are denoted by a semi-circular dot at the inhibit input. Each inhibit gate will pass its input to the output except when a signal is present at the inhibit input. The shift logic circuit is shown in FIG. 7. The inputs of the circuit are reverse, forward and neutral select signals on lines 500, 502 and 512, respectively, from the shift tower 102, and the above low signal on line 106 from the pump cam circuit 74. The output of the shift logic circuits selectively energize solenoids A, B and C according to the following table, wherein X denotes the solenoids energized for the specified range.

| Solenoid | | A | B | C |
|---|---|---|---|---|
| Range | | | | |
| | N (Neutral) | | x | |
| | R (Reverse) | x | x | |
| | L (Low) | x | x | |
| Forward | | | | |
| | H (High) | x | | x |

Those solenoids represent the shift solenoids 108 which regulate the function of the hydraulic control 110. The reverse select signal on line 500 and the forward select signal on line 502 are joined through diodes 504 to line 506 which forms an input to an inhibit gate 508. The output of the gate 508 is connected to an output driver 510 for solenoid A. The neutral select signal on line 512 is passed through a diode 514 to line 516 which forms the input to an inhibit gate 518. The output of gate 518 energizes solenoid B through output driver 520. Line 506 is connected to line 516 through a diode 524. The above low signal on line 106 is connected through an inhibit gate 526, the output of which energizes solenoid C through an output driver 528. An output line 530 is energized whenever the solenoid C is energized thereby indicating high range is attained. The line 106 is also connected to line 506 through a diode 532 and is further connected to the input of an inhibit gate 534, the output of which leads to the inhibit input of gate 518. The neutral select line 512 is connected to the inhibit inputs of the gates 508, 526 and 534.

In operation when reverse or forward range is selected, line 506 is energized and the gate 508 passes that signal to energize solenoid A. The same signal is passed through diode 524 and through gate 518 to energize the solenoid B thereby satisfying the above table for reverse and low ranges. In the event the above low signal is presented on line 106 indicating that a shift should be made to high range, that signal is passed through gate 526 to energize solenoid C and is passed through the gate 534 to the inhibit input of gate 518 thereby blocking any signal to solenoid B to de-energize that solenoid. The above low signal is also passed through diode 532 to line 506 to assure that the solenoid A remains energized thereby satisfying the table for high range. In the event neutral is selected, a signal is imposed on line 512 which passes through the diode 514 and gate 518 to energize solenoid B. The signal on line 512 is applied to the inhibit input of gates 508 and 526 to disable solenoid A and C as well as to inhibit the gate 534 to insure that no inhibit signal can pass to the gate 518.

Forward-Reverse Inhibit Circuit

FIG. 8 diagrammatically shows the forward-reverse inhibit circuit 122. The purpose of this circuit is to prevent any shift between forward and reverse at a high transmission output speed or when the transmission ratio is above zero by providing a reverse attained signal on line 130 when, and only when, reverse range has been selected at the shift tower 102 and the speed and ratio conditions are met, and to maintain the reverse attained signal if forward range is manually selected but the speed and ratio conditions are not met. In addition, a mode inhibit signal on line 129 and a forced downshift signal on line 132 are generated. A line 128 carrying the zero governor signal is fed to an inverter 536 to invert the logic state of the zero governor signal which is then applied to an input of an OR gate 538. The output speed signal on line 124 is applied to another input of the OR gate. Thus when the output speed is above a predetermined minimum or the control signal on line 72 is negative, the OR gate will produce a mode inhibit output on line 129 indicating that a shift between forward and reverse should not occur. A forward select line 502 is connected through a diode 540 to the input of an inhibit gate 542, the output of which is applied on line 554. Line 554 in turn is connected to an input of an AND gate 546, the inhibit input of an inhibit gate 548 and an input of an inhibit gate 550. The mode inhibit signal on line 129 provides a second input to the input gate 546, the output of which is applied to the input of gate 542 to form a latching circuit. The output of gate 550 is fed through an inhibit gate 552 to the forced downshift output line 132. The neutral select line 512 is applied to the inhibit input of the gate 552. The reverse select line 500 is connected through a diode 555 to the input of the inhibit gate 548, the output of which is the reverse attained line 130. Line 130 in turn is connected to an input of an AND gate 556, to the inhibit input of gate 542, and to the input of inhibit gate 558. The mode inhibit line 129 provides a second input to the AND gate 556, the output of which is connected to the input of gate 548 to form a latching circuit. The output of the gate 558 is applied to the input of gate 552. The reverse select signal on line 500 is also applied to the inhibit input of the gate 558 while the forward select line 502 is connected through diode 540 to the inhibit input of gate 550.

In operation when the transmission is operating in the forward range at some substantial ratio or speed, the mode inhibit line 129 will be energized and the forward select line 502 will have been energized. Then the line 544 will also be energized so that the AND gate 546 has an output which latches on the signal on line 544 so long as the mode inhibit signal is present. The signal on line 544 will not pass the gate 550 since its inhibit input is energized and there will be no forced downshift signal. The gate 548 will also be inhibited by the signal on line 544. Then if the forward select signal on line 502 is removed and the reverse select signal is applied to line 500, the line 544 will continue to be energized due to the operation of the latching circuit and the reverse select signal cannot pass through the gate 548 to line 130. Thus the requested shift to reverse cannot be immediately carried out. However, since the signal is removed from line 502, the gate 550 is enabled so that the signal on line 544 can pass to the forced downshift line 132. The governor circuit 60 in response to the forced downshift circuit will reduce the transmission ratio and therefore the output speed at the maximum allowed rate. When the ratio reaches zero and the output speed drops below its minimum value, the mode inhibit signal will be removed from line 129 thereby disabling the AND gate 546 and de-energizing line 544. Then the gate 548 is enabled so that the reverse select signal on line 500 can pass to the reverse attained line 130 thereby allowing the pump output driver 78 to enter the revese mode. An examination of the circuit of FIG. 8 will show that a similar operation occurs during operation in reverse range when forward range is selected. The neutral select signal on line 512 merely serves to inhibit the gate 552 so that a forced downshift signal will not be produced when neutral is selected.

High and Low Pressure Logic Circuit

The FIG. 9 diagrammatically shows the high and low pressure logic circuit 116. This circuit generates the pressure sense signal on line 120 which prevents a change of ratio during shifting between high and low range by holding the control signal on line 72 constant during that shifting. The pressure sense signal on line 120 is initiated when the solenoid C is energized or de-energized indicating that a shift to high or low is about to take place, and the pressure sense signal is terminated when the on-coming torque transmitting device is substantially engaged and the off-going device is substantially disengaged as signalled by the high clutch pressure switch 110 and the low brake pressure switch 108. Those switches preferably are designed to close and produce an output signal on line 112 or 114 when the fluid pressure applied to each device increases to 60 psi and to open when the pressure decreases to 50 psi. As shown in FIG. 9, line 530 which is energized when solenoid C is energized provides an input to an inhibit gate 560 which gate has an output on line 120. Line 530 is also connected to an inverter 562 which inverts the logic state of the signal on line 530 to provide an output on line 564 leading to another input of the gate 560. The line 114 provides an input to an inhibit gate 566, the output of which is connected to the inhibit input of gate 560. Line 112 is connected to the input of an inhibit gate 568, the output of which is also connected to the inhibit input of gate 560. Lines 564 and 112 are connected through diodes 570 and 572 respectively to the inhibit input of gate 566, while lines 530 and 114 are connected through diodes 574 and 576 respectively to the inhibit input of gate 568.

In operation in the low range, lines 530 and 114 are de-energized while lines 112 and 564 are energized. Then, there is no signal to the inhibit input of gate 568 so that the signal on line 112 passes to the inhibit of gate 560 to prevent a pressure sense signal on line 120. When a shift to high range is initiated, line 530 is energized and line 564 is de-energized. Then, a signal through the diode 574 is presented to the inhibit input of gate 568 and a signal through diode 572 is presented to the inhibit input of gate 566. Thus the gate 560 is enabled to pass the signal from line 530 to line 120 providing a pressure sense signal which prevents a ratio change. When the pressure in clutch 30 increases above 60 psi and the pressure in the brake 44 decreases below 50 psi, the line 112 becomes de-energized and the line 114 becomes energized. Since the signal from line 112 to the inhibit input of the gate 560 is then removed, the signal 114 passes through the gate 566 to the inhibit input of gate 560 to remove the pressure sense signal from line 120. This is an indication that the shift is essentially completed and the ratio may then change as dictated by the governor circuit. Examination of FIG. 9 will reveal that a similar operation occurs to provide a pressure sense signal during downshifting from high to low range.

The circuit of FIG. 9 has an additional feature that when the neutral select line 512 is energized, the gate 560 is inhibited to prevent a pressure sense signal. In addition the signal from line 512 is fed to the input of an inhibit gate 578 and to an input of an AND gate 580. The output of the inhibit gate 578 provides a neutral governor hold signal on line 121. The mode inhibit signal on line 129 provides a second input to the AND gate 580, the output of which is fed to the inhibit input of gate 578 and is also fed through a diode 582 to the input of the gate 578 as well as to the inhibit input of the gate 560. When both the neutral select and mode inhibit signals are applied, the AND gate has an output which disables the gate 578 and which also latches on the AND gate to provide an inhibit signal to gate 560 as long as the mode inhibit signal is present, even if the neutral select signal is removed. However, when the mode inhibit signal is not present, the neutral select signal will pass through the gate 578 to provide the neutral governor hold signal on line 121.

The hydraulic control 110 is shown in diagrammatic form in FIG. 10. The control 110 receives fluid under pressure from a conventional fluid pump 600 which draws fluid from a reservoir 602 through an inlet passage 604 and delivers fluid under pressure to a main pressure passage 606. Fluid pressure in passage 606 is controlled by a conventional pressure regulator 608 which may be constructed in accordance with the pressure regulator shown in U.S. Pat. No. 3,592,281. The control also includes a neutral valve 610, a shift valve 612, a first trip valve 614 and a second trip valve 616.

The neutral valve 610 has a valve spool 618 having equal diameter spaced lands a, b, and c where are slidably disposed in a valve bore 620. A compression spring 622 is compressed between valve land a and one end of valve bore 620 to urge the spool valve 618 toward the other end of valve bore 620. The valve land a cooperates with the valve bore 620 to form a neutral chamber 624. Fluid pressuring the neutral chamber 624 is controlled by the solenoid valve A such that when solenoid valve A is energized, the chamber 624 is open to exhaust. The valve land c and bore 620 cooperate to form a drive chamber 626. The main line 606 is in fluid communication with the valve bore 620 and also through restrictions 628 and 630 with the chambers 624 and 626 respectively. The valve bore 620 is also in fluid communication with a drive feed passage 632, a neutral passage 634, and two exhaust passages. In the spring-set position shown, the main passage 606 is in fluid communication with the neutral passage 634 between lands a and b while the drive passage 632 is connected to exhaust. When the solenoid A is energized thereby permitting the exhausting of pressure from chamber 624, fluid pressure in the drive chamber 626 will move the valve spool upward against the spring 622. In the pressure-set position, fluid pressure in main passage 606 is in fluid communication with drive passage 632 between lands d and c while the neutral passage 634 is connected to exhaust.

The shift valve 612 includes a valve spool 636 having equal diameters spaced lands a, b and c slidably disposed in a valve bore 638, a compression spring 640 compressed between valve land a and one end of valve bore 638, a high apply chamber 642 formed by valve land a and one end of valve bore 638 and a low apply chamber 644 formed by its valve land c and the other end of valve bore 638. Fluid pressure in the high apply chamber 642 is controlled by the solenoid valve C while fluid pressure in the low apply chamber 644 is controlled by solenoid valve B. The valve bore 638 is in fluid communication with the drive feed passage 632, a low apply passage 646, a high apply passage 648 and a high exhaust passage 668. The drive feed passage 632 is also in fluid communication with the low apply chamber 644 through a restriction 650. The low apply passage 646 is in fluid communication with the high apply chamber 642 through a restriction 652. The low apply passage 646 is also in fluid communication with the low brake 44 while the high apply passage 648 is in fluid communication with the high clutch 30. In the spring-set position shown, fluid pressure in the drive feed passage 632, as controlled by the neutral valve 610, is directed between lands a and b to provide fluid pressure to engage the low brake 44. Further, the high exhaust passage 668 and the high apply passage 648 are connected between lands b and c to exhaust the high clutch 30. Thus the shift valve 612 is in the low position. In the low position, solenoid B is energized to exhaust pressure from the low apply chamber 644 to maintain the valve in the position shown. When solenoid C is energized and solenoid B is de-energized, fluid pressure will develop in chamber 644 while chamber 642 is exhausted thus permitting the valve spool to move upwardly in bore 638 against the spring 640. In the pressure-set position thus obtained, fluid pressure in drive feed passage 632 will be directed between lands b and c to the high apply passage 648, while the low apply passage 646 is connected to a low exhaust passage 654. Fluid pressure in the low exhaust passage 654 is controlled by the second trip valve 616 which is explained below.

The first trip valve 614 includes a valve spool 656 having equal diameter spaced lands a and b silidably disposed in a valve bore 658, and a compression spring 660 compressed between one end of valve bore 658 and valve land a. The chamber formed by valve land a and the end of valve bore 658 is open to exhaust. A plug valve 662 is also slidably disposed in valve bore 658 and cooperates therewith to form a low control chamber 664 and a neutral control chamber 666. The valve bore 658 is in fluid communication with a high exhaust passage 668 and an exhaust passage. In the position shown, the high exhaust passage 668 is connected between lands a and b to the exhaust passage. The low control chamber 664 is in fluid communication with the low apply passage 646 while the neutral control chamber 666 is in fluid communication with the neutral passage 634. When the neutral valve 610 is in the spring-set position shown, fluid pressure in passage 634 is directed to the neutral control chamber 666 to move the valve spool 656 to the position shown such that the spring 660 is compressed. When the transmission is conditioned for the low drive ratio, fluid pressure in the low apply passage 646 is directed to the low control chamber 664 which pressure will also maintain the valve spool 656 in the position shown.

The trip valve 616 includes a valve spool 670 having equal diameter spaced lands a and b slidably disposed in a valve bore 672, and a compression spring 674 compressed between valve land a and one end of valve bore 672, which end of valve bore 672 is open to exhaust. A high control chamber 676 is formed between valve land b and the other end of valve bore 672 and is in fluid communication with the high apply passage 648. The valve bore 672 is in fluid communication with the low exhaust passage 654 and with an exhaust passage. In the spring-set position shown, the low exhaust passage 654 is blocked between lands a and b. When the transmission is conditioned for the high ratio drive, fluid pressure in the high apply passage acting in chamber 676 will move the shift valve downward against the spring 674 so that the low exhaust passage 654 will be connected to exhaust. This occurs during an upshift from low to high.

Initially on the upshift from low gear to high gear, the low brake 44 will remain engaged since the only exhausting of pressure from the low brake 44 is through the restriction 652. However, fluid pressure on the high clutch 30 is sufficient to overcome the spring 674 of the second trip valve 616, and the trip valve will be moved to provide an exhaust connection between passage 654 and the exhaust. When this occurs the low brake 44 will be rapidly exhausted through the shift valve 612 as will the pressure on the first trip valve in chamber 664. When the pressure in chamber 664 is exhausted, the first trip valve 614 will move to the spring-set position.

On a downshift from high to low, the shift valve 612 will be moved to the spring-set position shown. Fluid pressure in the low apply passage will apply the low brake 44 and will also begin to pressurize the chamber 664. The fluid pressure in the high clutch 30 will be directed to the high exhaust passage 668. Until the fluid pressure in the low brake 44 is sufficient to maintain the reaction device engaged, the high clutch 30 will remain engaged and the trip valve 614 will remain in the spring-set position. When the low brake 44 has sufficient engagement pressure, the trip valve 614 will be moved to the pressure set position shown thereby permitting rapid exhaust of the high clutch 30 through the trip valve 614. The solenoids A, B and C are controlled in accordance with the above description for the electronic control.

It will thus be seen that the control described herein provides an accurate regulation of a hydromechanical transmission by providing transmission ratio as a function of the time integral of the difference between the actual ratio and the requested ratio and limiting the rate of response to a requested ratio to assure gradual and smooth changes by limiting the value of the error signal by saturation of the operational amplifier 200. Further the transmission control effects a relaxation of ratio requirement when fluid pressure developed within the hydrostatic unit exceeds a predetermined amount by modifying the effect of the ratio error signal at the input of the operational amplifier 216. In addition, synchronous shifting of the gear set is assured by preventing ratio changes in the hydrostatic unit by suspending the input of the operational amplifier 232 to hold the ratio control signal constant at the synchronous ratio of the gear set during shifting.

The embodiments of the invention in which an exclusive property or privilege is claimed are defined as follows:

1. A control for a variable ratio hydrostatic transmission wherein the transmission responds rapidly and directly to a control signal derived independently of transmission output to provide a transmission ratio corresponding to the magnitude of the control signal comprising,
    means for providing a ratio request signal,
    means for comparing the ratio request signal with the control signal to produce an error signal, and
    means for integrating the error signal to produce the control signal whereby the control signal changes with time when an error signal is present to diminish the difference between the control signal and the ratio request signal.

2. A control for a variable ratio hydrostatic transmission wherein the transmission ratio responds to a control signal comprising,
    means for providing a ratio request signal,
    means for comparing the ratio request signal with the control signal to produce an error signal,
    means for integrating the error signal to produce the control signal whereby the control signal changes with time when an error signal is present to diminish the difference between the control signal and the ratio request signal, and
    means for limiting the maximum absolute value of the error signal whereby the rate of change of the control signal and hence the rate of change of the transmission ratio is limited to a maximum value to insure smooth ratio changes.

3. A control for a variable ratio hydrostatic transmission wherein the transmission ratio responds to a control signal comprising,
    means for providing a ratio request signal,
    means for comparing the ratio request signal with the control signal to produce an error signal corresponding to the difference of the compared signals including an amplifier having the request signal and the control signal as inputs thereto, the amplifier being arranged to saturate at a relatively low value of difference of the compared signals to thereby limit the maximum absolute value of the error signal, and
    means for integrating the error signal to produce the control signal,
    whereby the control signal changes with time when an error signal is present to diminish the difference between the control signal and the ratio request signal and the rate of change of the control signal and hence the rate of change of the transmission ratio is limited to a maximum value to insure smooth ratio changes.

4. A control for a variable ratio hydrostatic transmission wherein the transmission ratio responds to a control signal and wherein the fluid pressure within the transmission changes in response to ratio changes, comprising,
    means for providing a ratio request signal,
    means for comparing the ratio request signal with the control signal to produce an error signal,
    means for integrating the error signal to produce the control signal whereby the control signal changes with time when an error signal is present to diminish the difference between the control signal and the ratio request signal,
    means for limiting the maximum fluid pressure within the hydrostatic transmission including,
    pressure sensing means responsive to the fluid pressure for producing a pressure signal when a predetermined high pressure is attained, and
    means responsive to the pressure signal for altering the effect of the error signal and thereby changing the transmission ratio to decrease the fluid pressure in the transmission.

5. A control for a transmission having a variable ratio hydrostatic unit coupled with a multirange gear train wherein the hydrostatic unit ratio and the range of the gear train are controlled by a control signal comprising,
    means for providing a ratio request signal,
    means for comparing the ratio request signal with the control signal to produce an error signal, means for integrating the error signal to produce the control signal whereby the control signal changes with time when an error signal is present to diminish the difference between the control signal and the ratio request signal, means for shifting the range of the gear train including fluid pressure operated selectively engageable torque transmitting means, initiating means responsive to the control signal for initiating actuation of the torque transmitting means to effect a range shift, detecting means sensitive to the fluid pressure applied to the torque transmitting means for detecting the state of engagement of the torque transmitting means, and hold means responsive to the detecting means and to the initiating means for preventing any ratio change during the shift.

6. A control for a transmission having a variable ratio hydrostatic unit coupled with a multirange gear train wherein the hydrostatic unit ratio and the range of the gear train respond to a control signal comprising, means for providing a ratio request signal, means for comparing the ratio request signal with the control signal to produce an error signal, means for integrating the error signal to produce the control signal whereby the control signal changes with time when an error signal is present to diminish the difference between the control signal and the ratio request signal, means for shifting the range of the gear train including an on-coming and an off-going fluid pressure operated torque transmitting device, initiating means responsive to the control signal for initiating actuation of the devices, means sensitive to the fluid pressure applied to each device for providing pressure signals as a result of pressure application on the on-coming device and pressure relief on the off-going device thereby indicating that a range shift has been completed, and hold means responsive to the pressure signals and the initiating means effective at shift initiation for preventing any ratio change of the hydrostatic unit during the shift by holding the control signal constant and means responsive to the pressure signals for terminating the effect of the hold means when a shift has been completed.

7. A control for a variable ratio hydrostatic transmission driven by an engine wherein the transmission ratio responds to a control signal and wherein the engine speed is influenced by the transmission ratio, comprising, means for providing a ratio request signal, means for comparing the ratio request signal with the control signal to produce an error signal, means for integrating the error signal to produce the control signal whereby the control signal changes with time when an error signal is present to diminish the difference between the control signal and the ratio request signal, means for providing an engine speed signal, means for providing a reference signal corresponding to a desired engine speed limit, and means responsive to the engine speed signal and the reference signal for modifying the error signal when the engine speed surpasses the engine speed limit to change the control signal and therefore the transmission ratio in a direction to return the engine speed to the speed limit.

8. A control for a variable ratio hydrostatic transmission driven by a throttle controlled engine wherein the transmission ratio responds to a control signal and wherein the engine speed is influenced by the transmission ratio, comprising, means for providing a ratio request signal, means for comparing the ratio request signal with the control signal to produce an error signal, means for integrating the error signal to produce the control signal whereby the control signal changes with time when an error signal is present to diminish the difference between the control signal and the ratio request signal, means for providing an engine speed signal, means for providing a first reference signal corresponding to desired maximum engine speed limit and a second reference signal corresponding to a desired minimum engine speed limit, at least one of the reference signals being varied according to throttle setting, and means responsive to the engine speed signal and the reference signals for modifying the error signal when the engine speed surpasses either limit to change the control signal and therefore the transmission ratio in a direction to maintain the engine speed within the limits.

9. A control for a transmission having a variable ratio hydrostatic unit coupled with a multirange gear train wherein the hydrostatic unit ratio and the range of the gear train are controlled by a control signal and wherein the fluid pressure within the hydrostatic unit changes in response to ratio changes, comprising, means for providing a ratio request signal, means for comparing the ratio request signal with the control signal to produce an error signal, means for integrating the error signal to produce the control signal whereby the control signal changes with time when an error signal is present to diminish the difference between the control signal and the ratio request signal, means for limiting the maximum absolute value of the error signal whereby the rate of change of the control signal and hence the rate of change of the transmission ratio is limited to a maximum value to insure smooth ratio changes, means for limiting the maximum fluid pressure within the hydrostatic transmission including, pressure sensing means responsive to the fluid pressure for producing a pressure signal when a predetermined high pressure is attained, and means responsive to the pressure signal for altering the effect of the error signal and thereby changing the transmission ratio to decrease the fluid pressure in the transmission, means for shifting the range of the gear train including fluid pressure operated selectively engageable torque transmitting means, initiating means responsive to the control signal for initiating actuation of the torque transmitting means to effect a range shift, detecting means sensitive to the fluid pressure applied to the torque transmitting means for detecting the state of engagement of the torque transmitting means, and hold means responsive to the detecting means and to the initiating means for preventing any ratio change during the shift.

* * * * *